C. C. MADISON.
ATTACHMENT FOR TRACTION WHEELS.
APPLICATION FILED DEC. 17, 1915.
1,211,206.
Patented Jan. 2, 1917.
2 SHEETS—SHEET 2.
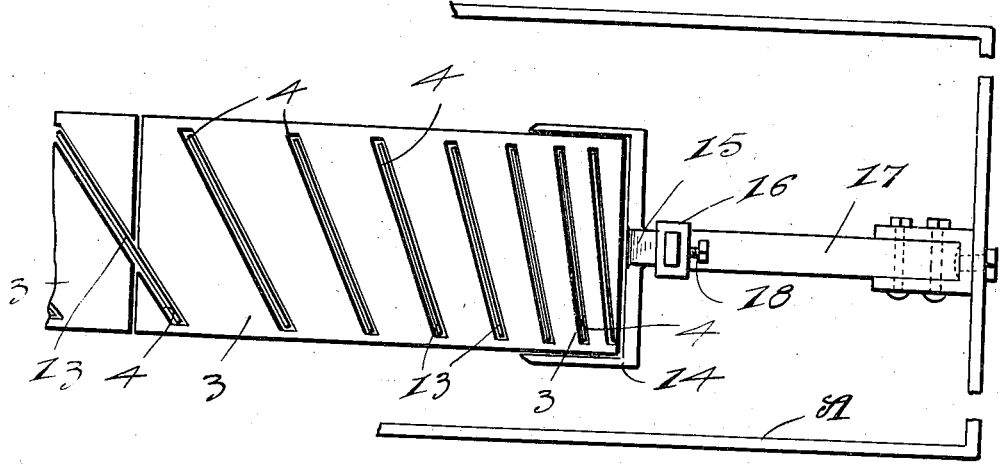
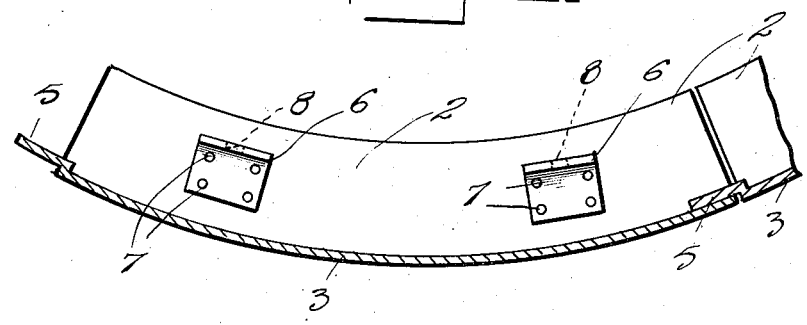
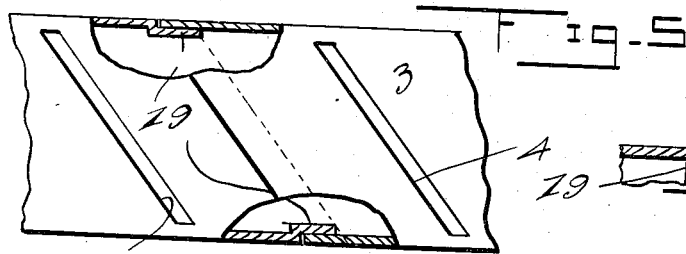
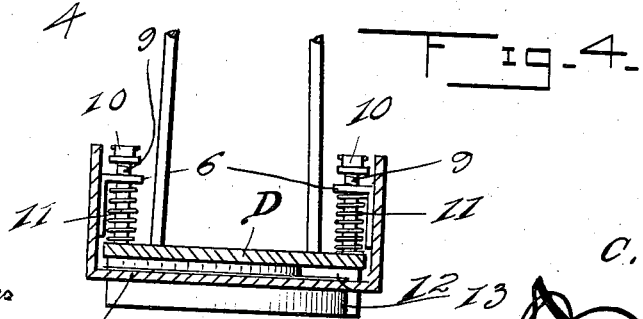
Witnesses
Inventor
C. C. Madison
By
Attorney

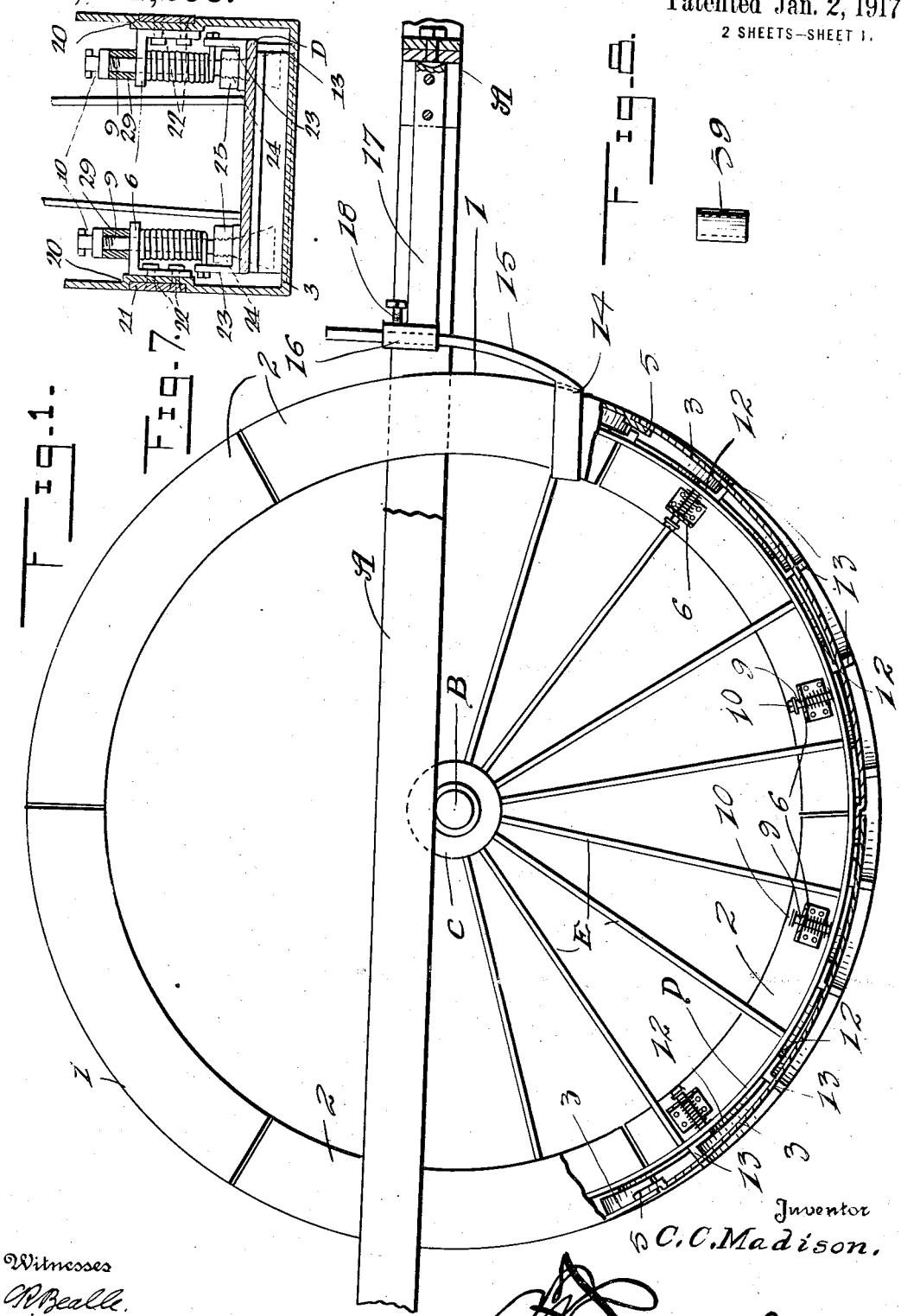

UNITED STATES PATENT OFFICE.

CHARLES C. MADISON, OF SCANDIA, KANSAS.

ATTACHMENT FOR TRACTION-WHEELS.

1,211,206.

Specification of Letters Patent. Patented Jan. 2, 1917.

Application filed December 17, 1915. Serial No. 67,428.

*To all whom it may concern:*

Be it known that I, CHARLES C. MADISON, a citizen of the United States, residing at Scandia, in the county of Republic and State of Kansas, have invented certain new and useful Improvements in Attachments for Traction-Wheels; and I do hereby declare the following to be a full, clear, and exact description of the invention, such as will enable others skilled in the art to which it appertains to make and use the same.

The primary object of this invention is to provide an attachment for the wheels of traction engines, binders, and such vehicles, that will increase the traction between the wheels and ground, when the latter is in soft condition.

Another object of the invention is to provide an attachment for carrying out the above object, which will be of simple construction, cheap to manufacture, will be durable and efficient in operation, and which can be conveniently applied to or removed from position on the wheels.

Other objects will appear and be better understood from that embodiment of my invention of which the following is a specification, reference being had to the accompanying drawing, forming a part thereof in which:—

Figure 1 is a side view of a portion of the frame of a vehicle, showing one of the rear wheels thereof, with the improved attachment applied thereto. Fig. 2 is a sectional plan view of the wheel with the attachment applied thereto. Fig. 3 is a longitudinal sectional view taken through one of the segments. Fig. 4 is a transverse sectional detail view taken through the wheel with the attachment applied thereto. Fig. 5 is a fragmentary section taken at the opposed ends of certain adjacent segments and showing a modified form of connection between adjacent segments. Fig. 6 is a horizontal section taken through the opposed ends of the sides of adjacent segments. Fig. 7 is a transverse sectional detail view taken through the rim of the wheel and one of the segments and showing a modified form of connection for the springs. Fig. 8 is a side view, on an enlarged scale, of one of the metallic tubes adapted to be fitted over the inner end of one of the rods carried by the wheel rim and inserted between the nut on the inner end of the rod and the adjacent arm of the adjacent bracket carried by one of the segments.

Referring to the drawings in detail, the letter A designates, for conventional purposes, a portion of the frame of a traction engine, B an axle, and C one of the rear traction wheels, the said wheels including the enlarged rim D and spokes E.

The attachment comprises a plurality of segments 1 arranged in position around the rim of the wheel, and each segment is substantially U-shaped in cross section having its sides designated by the numeral 2, extending inwardly beyond the sides of the rim of the wheel and having the connecting portion for the sides, designated at 3, arranged in spaced relation with the tread portion of the rim of the wheel. The connecting portion 3 of each segment is provided with a series of diagonally extending slots 4, and one end of the connecting portion of the segment is extended beyond the adjacent ends of the sides 2 and offset inwardly to provide a flange 5, the flange on the end of one connecting portion 3 overlying the end of the adjacent connecting portion, on the adjacent segment.

The extended portions of the sides of the segment have their inner surfaces provided with inverted L-shaped brackets 6, the long arms of the brackets being secured to the side of the segment by means of clamping elements 7 and the short arms of the L-shaped brackets projecting inwardly of the wheel and provided with openings 8. The inner side of the rim D of the wheel has secured thereto, at spaced points, and adjacent the side edges of the rim D, the outer ends of inwardly extending cylindrical shaped rods 9, which slidably extend through the openings 8 in the short arms of the angular shaped bracket and have their free ends threaded for the accommodation of lock nuts 10. Contractile springs 11 surround the rods 9 and are interposed between the short arms of the L-shaped bracket and the rim and have their ends connected thereto, and the said springs serve to move the segments outwardly.

Interposed between the rim D of the wheel and the connecting portions 3 of the segments are a plurality of substantially L-shaped members 12, the short arms 13 of which slidably extend through the slots 4 of the connecting portions 3, for the sides of the segments 1. The long arms of the L-shaped members 12 are normally spaced from the adjacent connecting portions 3 and are secured to the periphery of the rim D of the wheel, and the long arms of the members 12 adjacent the offset portions 5 of the segments, are spaced sufficiently so as to lie on opposite sides of the offset portions 5.

Associated with the wheel, is a scraping device which includes a substantially U-shaped frame 14 which straddles the wheel, as shown in Fig. 2, and is provided with a vertically extending upright 15, which is slidably received by a sleeve 16 carried by the inner end of the horizontally disposed rod 17, the outer end of the rod having rigid connection with the frame A. The upright 15 is held in different adjusted positions, by means of a set screw 18 which is adjustable through the sleeve 16 and against the upright 15. The scraping device is adapted to remove mud, or other material, from the segment 1 during the travel from engagement with the ground.

The modification as shown in Figs. 5 and 6, the connecting portions 3 for each segment, is substantially diamond in shape in plan, and each segment has one end of each side 2 offset inwardly to provide the flanges 19. The flanges 19 on one section, form seats for the adjacent ends of the walls 2 of the adjacent section, as shown in Fig. 5, so as to admit of the side walls 2 of all the sections lying flush.

In the modification shown in Fig. 7, the sides 2 of the segments are provided with countersunk portions 20, which form inwardly extending seats for the vertical arms of the bracket 6 and the said countersunk portions receive plate 21, through which extend fastening screws 22, and hold the plates and brackets 6 in position. In this construction, the rods 9 extend through the horizontal arms of the L-shaped brackets 23, which arms are arranged in engagement with the inner side of the rim D of the wheel and the said rods are provided with threaded portions 24, adjacent their outer ends, and upon which are turned nuts 25, which are adjustable against the inner sides of the horizontal arms of the L-shaped member 23. The vertical arms of the L-shaped member 23, are arranged in spaced relation with the inner surfaces of the side 2 of the adjacent segment and have openings therein for the reception of the lower ends of the springs 11, the upper ends of the springs 11 being extended and attached to the coils and received by openings in the horizontal arms of the L-shaped bracket 6 and terminally extended laterally so as to prevent the accidental disconnection of the springs from the bracket.

When the ground is dry, and it is not desired to force the blades 13 in engagement with the ground, metallic tubes, an example of which is shown at 59 in Fig. 8 of the drawings, are positioned between the brackets 6 and the nuts on the rods 9, thereby preventing inward movement of the segments when they come in contact with the ground, resulting in the blades 13 remaining in inoperative position.

In use, when the different segments are brought into engagement with the ground, they will be moved inwardly, as shown in Fig. 1, and the short arms 13 of the L-shaped members projected through the adjacent slots 4 in the connecting portions 3 for the sides of the segment 1, the said short arms serving as blades and operatively engage in the ground. When the segments are moved upwardly, the springs 9 will be expanded and when the segments leave the ground the springs will contract and move the segments to normal position, whereby the free ends of the short arms of the L-shaped members will lie flush with the outer surfaces of the connecting portions 3 of the segment.

Having thus described my invention, what I claim as new is:—

1. An attachment for vehicle wheels comprising, a plurality of segments engaging over the rim of the wheel and each being U-shaped in cross section, the said segments having slots therein, L-shaped members interposed between the segments and the wheel rim and having short arms slidably extending through the slots in the segments, brackets carried by the sides of the segments and having portions extending inwardly of the wheel and in spaced relation to the inner surface of the rim of the wheel, and resilient members interposed between the inner surface of the wheel rim and the extended portion of the bracket, as and for the purpose specified.

2. The combination with a wheel rim, of a plurality of segments removably and slidably associated with the rim, and each segment being U-shaped in cross section and having a plurality of slots therein, one end of the connecting portions for the sides of each segment being extended beyond the adjacent ends of the sides and offset inwardly to provide a flange, the flange on the connecting portion for the sides of one segment being arranged in overlapping relation with one end of the connecting portion for the sides of the adjacent segment, ground engaging members slidable through the slots in the segments, and resilient members associated with the segments and the wheel rim, for returning the segments to normal position, after operation, for the purpose specified.

3. The combination with a wheel rim, of a plurality of segments removably and slidably associated with the rim, each of the segments being U-shaped in cross section, and provided with slots, ground engaging members interposed between the segments and the rim of the wheel and slidable through the slots in the segment, brackets carried by the sides of the segment and extending inwardly of the wheel and spaced from the inner surface of the rim and provided with openings, rods carried by the inner surface of the wheel rim and slidable through the openings in the extended portions of the bracket, and springs surrounding the rods and interposed between the extended portions of the bracket and the inner surface of the wheel rim, for the purpose specified.

4. An attachment for a vehicle wheel comprising a plurality of segments slidably engaging over the vehicle wheel and each being U-shaped in cross section, the segments having slots therein, L-shaped members interposed between the segments and the wheel rim and having short arms slidably extending through the slots in the segments, brackets secured to the sides of the segments and having portions extending inwardly of the rim and spaced relation thereto, L-shaped members carried by the inner surface of the rim of the wheel and alined with the inwardly extending portions of the L-shaped brackets carried by the segments, rods extending through the wheel rim and the brackets on the inner side of the wheel rim loosely received by openings in the inwardly extending portions of the L-shaped brackets carried by the segments, nuts turned on the rods and adjustable against the L-shaped members on the inner surface of the rim, and springs encircling the rods and interposed between the inwardly extending portions of the L-shaped brackets carried by the segments, and the nuts on the rods.

5. The combination with a wheel rim, of a plurality of sections slidably associated with the wheel rim and having slots therein, ground-engaging members interposed between the sections and the wheel rim and slidable through the slots in the sections, brackets carried by the sections, rods carried by the inner surface of the wheel rim slidably associated with the brackets, springs surrounding the rods and interposed between the brackets and the inner surface of the wheel rim, nuts on the inner ends of the rods, and means to be positioned between the nuts and the brackets to prevent movement of the sections.

In testimony whereof I affix my signature in presence of two witnesses.

CHARLES C. MADISON.

Witnesses:
   Ed. Rosenquist,
   H. E. Moore.